(12) United States Patent
Hwangbo et al.

(10) Patent No.: US 12,514,404 B2
(45) Date of Patent: Jan. 6, 2026

(54) BLENDER

(71) Applicant: LG ELECTRONICS INC., Seoul (KR)

(72) Inventors: Kyungsoo Hwangbo, Seoul (KR); Mingyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 604 days.

(21) Appl. No.: 17/921,104

(22) PCT Filed: May 6, 2021

(86) PCT No.: PCT/KR2021/005669
§ 371 (c)(1),
(2) Date: Oct. 24, 2022

(87) PCT Pub. No.: WO2022/005007
PCT Pub. Date: Jan. 6, 2022

(65) Prior Publication Data
US 2023/0157486 A1 May 25, 2023

(30) Foreign Application Priority Data

Jul. 2, 2020 (KR) .................. 10-2020-0081552

(51) Int. Cl.
*A47J 43/00* (2006.01)
*A47J 43/07* (2006.01)

(52) U.S. Cl.
CPC .................. *A47J 43/0772* (2013.01)

(58) Field of Classification Search
CPC ............................... A47J 43/07722
See application file for complete search history.

(56) References Cited

U.S. PATENT DOCUMENTS

2017/0095122 A1\* 4/2017 Hoare .................... A23N 1/003

FOREIGN PATENT DOCUMENTS

| KR | 10-0657600 B1 | 12/2006 |
| KR | 100796634 B1 | 1/2008 |
| KR | 10-2013-0020533 A | 2/2013 |
| WO | 2017118379 A1 | 7/2017 |

OTHER PUBLICATIONS

Korean Office Action mailed Jul. 7, 2025 (Year: 2025).\*

\* cited by examiner

*Primary Examiner* — Anshu Bhatia
(74) *Attorney, Agent, or Firm* — Bryan Cave Leighton Paisner LLP

(57) ABSTRACT

Proposed is a blender which detects whether a container lid is closed by transmitting an electrical signal through a transparent film. The blender according to the present disclosure comprises a container body in which food is accommodated; a main body provided under the container body so as to support the container body; the container lid detachably mounted on the upper surface of the container body so as to open and close the upper side of the container body; and a detection system which detects whether the container lid is mounted on the container body, wherein the detection system includes a transparent electrode film configured to have multiple layers so as to guide the flow of electricity. Therefore, the blender has the advantage of preventing an assembly defect without damaging the appearance of the container body formed of a transparent material.

17 Claims, 10 Drawing Sheets

BLENDER

CROSS-REFERENCE TO RELATED APPLICATION

This application is the National Stage filing under 35 U.S.C. 371 of International Application No. PCT/KR2021/005669, filed May 6, 2021, which claims priority to and the benefit of KR Patent Application No. 10-2020-0081552, filed on Jul. 2, 2020, the disclosure of which is incorporated herein by reference in its entirety.

TECHNICAL FIELD

The present disclosure relates generally to a blender. More particularly, the present disclosure relates to a blender which has the function of detecting whether a container lid is closed by transmitting an electrical signal through a transparent film.

BACKGROUND ART

Generally, a blender is referred to as a mixer or crusher, and is mainly used for crushing or chopping food contained in a container body by rotating blades by the rotation of a motor.

In a normal blender, a main body having a motor operated by electricity is located at the lower side of the blender, and the container body receiving food is seated on the upper side of such a main body. Blades crushing or chopping food are provided inside the container body, and are rotated by the rotational force of the motor.

Accordingly, when a user drives the motor by using a manipulation button or a knob of the main body after putting food in the container body, the blades receiving the rotational force generated by the motor crush or chop food contained inside the container body.

Various types of blenders have recently been developed in accordance with a user's desire to facilitate the food intake of office workers due to their busy daily life. That is, a small hand blender has been developed, and a blender has been developed that allows food to be crushed in a larger capacity or at high speed.

Additionally, a vacuum blender which cuts or crushes food by vacuumizing the inside of a container body so that the food accommodated in the container body of the blender can be processed in a fresher state is also disclosed.

However, what is increasingly emphasized in these various types of blenders is safety along with the taste and nutrition of food processed by these machines. That is, when blades rotate while a container lid is open, food contained in the container body is thrown out and scattered, and an accident may occur when a child puts his or her finger inside the container body.

Accordingly, a technology for detecting whether a container lid is mounted has been developed and disclosed.

For example, as disclosed in U.S. Pat. Nos. 6,910,800 and 7,871,196, a push rod which physically connects a container body with a main body is installed, and when the container lid closes the container body, the container lid presses the push rod.

Specifically, in U.S. Pat. No. 6,910,800, a link is provided longitudinally along the side surface of the container body, and when the container lid at an upper side is closed, the protrusion of the container lid presses the upper end of the link downward such that the lower end of the link is moved downward, so the closing of the container lid of the container body can be mechanically detected.

Additionally, in U.S. Pat. No. 7,871,196, a link which transmits the closing of the container lid to the upper and lower sides of the container body is not provided on the side surface of the container body, but is provided inside the handle of the container body. That is, a push rod installed to be vertically long is installed in the groove of the inside of the handle, and when the push rod is moved downward by the closing of the container lid at the upper side, a switch provided at a lower side is activated by the push rod to detect the closing of the container lid.

However, in these conventional technologies, a separate push rod or push block is required to be installed, and the link or push rod installed to be vertically long is required to be installed according to the length of an associated part, and thus manufacturing and assembly thereof are difficult, and the link or push rod is worn or damaged due to frequent use thereof, which causes the loss of a detection function. Additionally, the link or push rod having a considerably long length may not perform a detection function (a signal transmission function) due to the twisting or bending of the link or push rod.

In addition, the push rod and a press detection part are required to be separately installed, and the press detection part may be contaminated due to moisture or food introduced thereinto, and the push rod of the container body and the press detection part of the main body are required to be respectively installed at positions corresponding to each other, so the container body is required to be installed only in a specific direction.

Furthermore, as in the conventional technology, in a connection structure of transmitting a signal to the upper and lower sides of the container body by using a mechanical structure (or wire), when the container body is formed to be transparent or translucent, at least a portion of the container body is required to be opaque such that a transmission mechanism or wire is not seen from the outside, thereby reducing the degree of design freedom.

In addition, recently, US Patent Application Publication No. 2018-0020875 discloses an interlocking blending device in which a pair comprised of a transmission coil and a reception coil is arranged in a main body and a pair comprised of a reception coil and a transmission coil is arranged in a container body by corresponding to the coils, and when a container lid closes the container body, power is transmitted to the reception coil of the container body through the transmission coil of the main body and is transmitted back to the reception coil of the main body through the transmission coil of the container body such that the main body recognizes the closing of the container lid of the container body.

That is, US Patent Application Publication No. 2018-0020875 discloses a structure of allowing or disallowing signal transmission in which a push rod is installed vertically along the side surface of the container body such that the signal of detecting the closing of the container lid is mechanically transmitted to the lower side of the container body, and according to the turning on/off of the switch of the upper side of the container body by the container lid, a circuit connected between the upper side of the container body and a lower side thereof is opened or closed so as to allow or disallow signal transmission to a base.

However, in such a conventional technology, a connection wire for the connection of two switches of the upper end part of the container body and for transmitting an electrical signal between the upper and lower ends of the container body is installed to connect the periphery of the upper end of the container body with the upper and lower ends of the container body.

Accordingly, since this connection wire is installed on the periphery of the upper end of the container body or is vertically installed on the side surface of the container body, the appearance of the transparent container body is damaged. That is, a connection wire for transmitting an electrical signal is installed on the surface of the container body and thus may be cut by external interference, or a colored connection wire is installed on the transparent container body, which may damage the design of the container body.

DISCLOSURE

Technical Problem

Accordingly, the present disclosure has been made to solve the above problems occurring in the prior art, and the present disclosure is intended to provide a blender which electrically transmits the detection signal of the closing of a container lid of a container body to a main body.

The present disclosure is intended to provide a blender which can maintain the design of the container body made of a transparent material.

The present disclosure is intended to provide a blender which is provided with a handle having improved beauty, soft touch, and degree of design freedom.

The present disclosure is intended to provide a blender in which a transparent electrode film is prevented from being electrically disconnected by external impact or vibration.

The present disclosure is intended to provide a blender in which during the assembly of the transparent electrode film, the transparent electrode film is prevented from being physically damaged even when a pulling force or other external forces are applied to the transparent electrode film.

Technical Solution

In order to accomplish the above objectives, according to the characteristic of the present disclosure, a blender of the present disclosure may include a detection system which detects whether a container lid is mounted through an electrical signal.

In the present disclosure, a transparent electrode film may be provided between the upper and lower ends of a container body. Accordingly, without damage to the design of the container body which is transparent, a signal of the upper end of the container body may be transmitted to the lower end thereof.

In the present disclosure, the transparent electrode film may have multiple layers. Accordingly, a transmission member made of a conductive member may be protected from the outside.

In the transparent electrode film of the present disclosure, the transmission member which transmits an electrical signal may be configured to be printed on a base film.

In the transparent electrode film of the present disclosure, the transmission member which transmits an electrical signal may be configured to be covered by a cover film.

In the present disclosure, the transparent electrode film may be attached and fixed to the container body by a fixing member having an adhesive function.

In the present disclosure, the transparent electrode film may be configured as a single member. Accordingly, the transparent electrode film may be prevented from being cut or separated into two or more films even when an external force is applied to the transparent electrode film.

The transparent electrode film of the present disclosure may be provided with a support part so as to supplement resistance against external force.

The transparent electrode film of the present disclosure may include at least one groove to prevent damage or tearing thereof due to bending thereof.

The transparent electrode film of the present disclosure may be provided with at least one reinforcement piece which reinforces the rigidity of the transparent electrode film.

The transparent electrode film of the present disclosure may be coupled to the container body by a hook fastening method.

The blender of the present disclosure may include the container body in which food is accommodated; a main body provided under the container body so as to support the container body; the container lid mounted detachably on the upper surface of the container body so as to open and close the upper side of the container body; and the detection system which detects whether the container lid is mounted on the container body, wherein the detection system may include the transparent electrode film configured to have multiple layers so as to guide the flow of electricity.

In addition, the transparent electrode film may include the transmission member which transmits an electrical signal, and the base film on which the transmission member is printed.

The cover film which supports the transmission member may be provided at one side of the transmission member.

The fixing member which allows the transparent electrode film to be attached to the container body may be provided at the one side of the transmission member.

One surface of the fixing member may be in contact with one surface of the cover film.

An adhesive member may be provided between the transmission member and the cover film such that the transmission member and the cover film are coupled to each other.

A coating layer may be formed on an end of the transmission member so as to prevent corrosion thereof.

The transparent electrode film may be a single member configured such that a first end thereof is connected with a second end thereof.

The transparent electrode film may include 7| a main part attached to the container body, a first bent part formed by bending and extending from a first end of the main part, and a second bent part formed by bending and extending from a second end of the main part.

A support part may be provided on the first bent part so as to supplement resistance against external force.

A tear prevention groove may be formed in the support part so as to prevent damage or tearing thereof due to bending between the main part and the first bent part.

A reinforcement piece may be provided at one side of the support part so as to reinforce rigidity thereof.

A reinforcement piece may be provided at an end of the transparent electrode film so as to reinforce rigidity thereof.

The end of the transparent electrode film may be coupled to the lower or upper end part of the container body by a hook fastening method.

A hook groove into which a hook is inserted may be formed in the end of the transparent electrode film by passing therethrough.

Advantageous Effects

The blender of the present disclosure has the following effects.

First, in the present disclosure, an electric circuit formed in the container body may be configured to be opened or closed depending on whether the container lid is closed such that whether the container lid is closed is electrically detected. Accordingly, compared to a conventional mechanical detection, whether the container lid is closed may be precisely detected in spite of long-term use thereof. That is, malfunction due to deformation of or damage to a link or a push rod of a conventional technology due to long-term use thereof may be prevented.

Second, in the present disclosure, the transparent electrode film may be attached vertically to the surface of the transparent container body such that electricity is conducted between the upper and lower sides of the container body, and thus whether the container lid is mounted may be detected. Accordingly, without damage to the external design of the transparent container body, whether the container lid is mounted may be detected. That is, the degree of the design freedom of the container body may be improved.

Third, in the present disclosure, the transparent electrode film, a permanent magnet, and a detection sensor may be used such that the signal of detecting the closing of the container lid of the upper end of the container body is transmitted to a lower side thereof. Accordingly, compared to the use of the link or push rod of the conventional technology, the associated parts of the present disclosure may be easily assembled and installed, and since the blender does not require a push rod or a press detection part, the blender may be light and manufacturing costs thereof may be reduced.

Fourth, in the present disclosure, the transparent electrode film may be configured as one single member. Accordingly, the transparent electrode film may have strong resistance against external tensile force, compared to multiple parts connected to each other. That is, as for multiple parts connected to each other, when external pulling force is applied to the multiple parts, connection portions therebetween may be fractured or damaged. In the present disclosure, the transparent electrode film may prevent the risk of this fracture, thereby improving durability.

Fifth, in the present disclosure, the transparent electrode film may have multiple layers, and the transmission member which transmits an electrical signal may be located inside the transparent electrode film. Accordingly, the transmission member which guides the flow of electricity may be protected from external impact or contact.

Sixth, in the present disclosure, the transmission member which transmits an electrical signal may be printed on the base film. Accordingly, the risk of the transmission member being cut or damaged due to external friction by protruding to the outside may be reduced.

Seventh, in the present disclosure, the end of the transparent electrode film may be coated with carbon. Accordingly, the connection part of the transparent electrode film may be prevented from being corroded.

Eighth, in the present disclosure, the transparent electrode film may further include the support part to support the secure attachment of the transparent electrode film to the container body. Accordingly, the transparent electrode film may have supplemented resistance against an external force.

Ninth, in the present disclosure, the tear prevention groove may be formed in the support part of the transparent electrode film. Accordingly, even when the transparent electrode film is installed by being bent, the transparent electrode film may be prevented from being damaged or torn.

Tenth, in the present disclosure, a separate reinforcement piece may be provided on an end part of the transparent electrode film. Accordingly, the rigidity of the transparent electrode film may be increased.

Eleventh, in the present disclosure, the end of the transparent electrode film may be coupled to the lower or upper end part of the container body by a hook fastening method. Accordingly, even if the blender is vibrated or impacted, or even if assembly failure by a worker occurs, the transparent electrode film may be prevented from being removed.

Twelfth, in the present disclosure, the hook groove into which a hook protrusion is inserted may be formed in the end of the transparent electrode film by passing therethrough, so during the coupling of the transparent electrode film, when the hook protrusion of a hook connector is inserted into the hook groove, an insertion sound of "click" may be generated. Accordingly, since a user can audibly recognize whether the connection of the end of the transparent electrode film is completed (whether normal connection thereof is performed), the assembly defect of the associated product may be prevented.

Accordingly, in the present disclosure, the transparent electrode film may be configured to have multiple layers such that the transmission member which transmits an electrical signal is covered by the cover film. Accordingly, overall, the transparent electrode film may be structurally strong against damage or impact caused by external interference during assembly or use, thereby securing durability.

In addition, the transparent electrode film may be made of one material, and ends thereof may be securely fixed by hooks, so the transparent electrode film may be prevented from being torn by external tensile force and from being removed from a position thereof by vibration or impact, thereby improving durability and usability thereof.

MODE FOR INVENTION

Hereinafter, a blender of the present disclosure will be described in detail with reference to the accompanying drawings.

Figure 1:
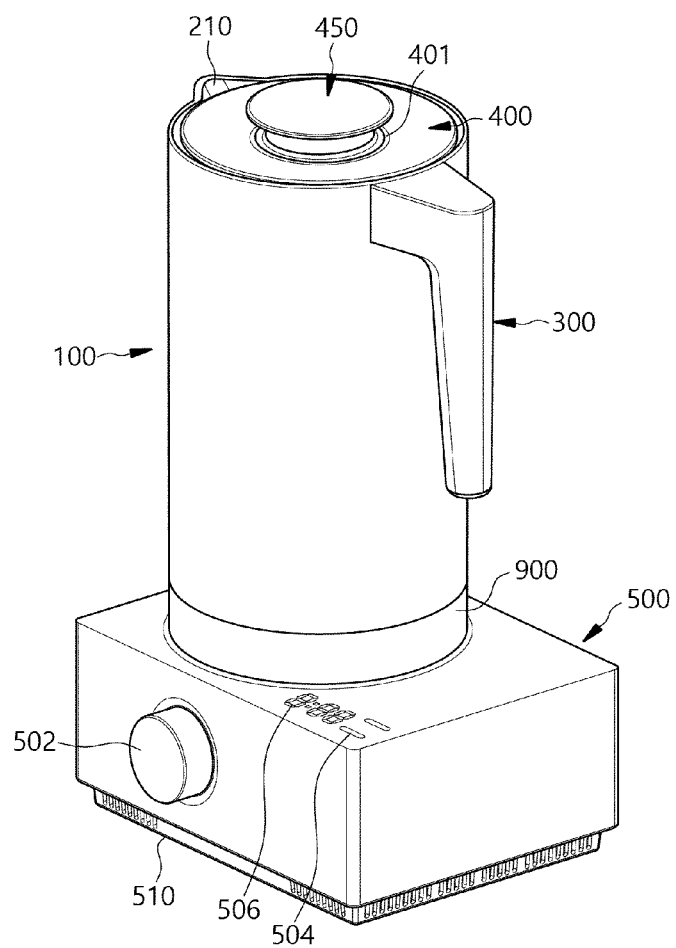
FIG. 1 is a perspective view illustrating the configuration of a blender according to an exemplary embodiment of the present disclosure.
Figure 2:
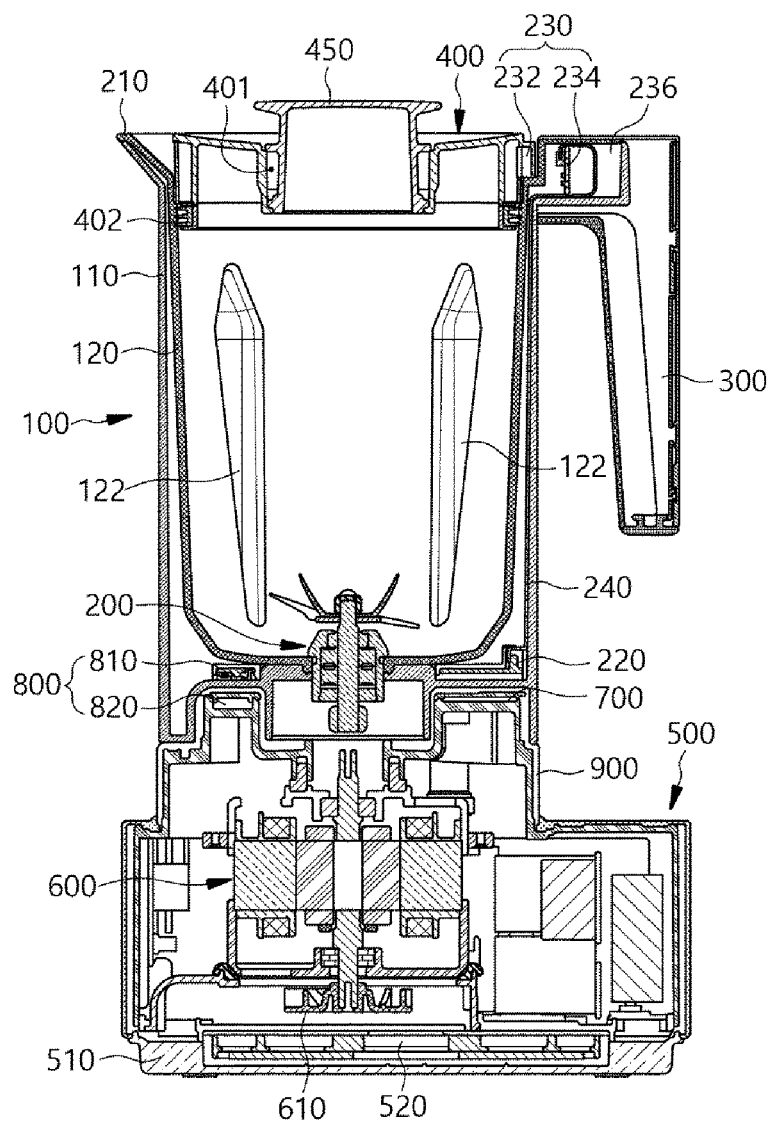
FIG. 2 is a vertical sectional view illustrating the inner configuration of the blender of the present disclosure.

FIGS. 1 and 2 are a perspective view and a vertical sectional view, respectively, illustrating the configuration of the blender according to an embodiment of the present disclosure.

As illustrated in these drawings, the blender of the present disclosure may include a container body 100 located relatively at the upper side thereof and configured to receive food, and a main body 500 provided at the lower side of the container body 100 and configured to support the container body 100.

The container body 100 may be a part in which food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and the upper surface thereof may be configured to be open to introduce food thereinto.

The container body 100 may be made of a transparent material such that the inside thereof can be seen from the outside. That is, the container body 100 may be made of glass or transparent plastic so that a user can check the state of food contained inside the container body 100 from the outside.

A blade assembly 200 may be provided in the inner lower portion of the container body 100. The blade assembly 200 may have multiple blade units mounted rotatably thereto such that the blade units chop or crush food received in the container body 100.

The blade assembly 200 may be connected to a motor assembly 600 to be described below, and be configured to be rotated by a rotational force generated by the motor assembly 600.

The container body 100 may be formed to have a double structure. That is, the container body 100 may be composed of an outer container body 110 constituting the appearance thereof and an inner container body 120 provided inside the outer container body 110. The outer container body 110 and the inner container body 120 may be configured to be in contact with each other or to be spaced apart by a predetermined distance from each other. Furthermore, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide food rotating in the container body 100, and may be configured in pairs symmetrical to each other in the front and rear or left and right of the inner container body 120.

A handle 300 grasped by a user may be formed on the right surface of the container body 100 by protruding therefrom to the right side. Such a handle 300 may be configured such that a user can grasp the handle with his or her one hand, and in the present disclosure, the upper end of the handle is illustrated to be connected integrally to the upper surface of the container body 100.

Meanwhile, a spout 210 may be formed at the opposite side to the handle 300.

As illustrated in FIG. 2, the spout 210 may be formed on the upper end of the left surface of the container body 100, and may be a part through which food completely crushed in the container body 100 is guided to be easily poured to the outside. Accordingly, such a spout 210 may be configured to more protrude gradually upward in the left direction.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that food contained in the container body 100 is not removed to the outside and foreign matter of the outside is not introduced into the container body 100.

The container lid 400 may be configured to be mounted to the container body 100 by pressing or rotating the container lid 400 by a user. A gasket 402 may be provided in the outer circumferential surface of the container lid 400 and block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than the diameter of the container lid 400. The cap 450 may be removably mounted to the container lid 400 by forcible fitting by pressing or by rotating.

In the present disclosure, it is illustrated that the cap 450 is configured to be attached to and detached from the container lid 400 by being rotated, and a detailed configuration thereof will be described below.

Since the cap 450 may be removably mounted to the container lid 400, a user may see food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be configured by protruding toward a side upper than the upper end of the container lid 400, so the cap 450 may function as the handle of the container lid 400 grasped by a user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB (a printed circuit board) may be installed inside the main body 500. Of course, the external shape of such a main body 500 may be variously changed as required.

The motor assembly 600 may be provided at the center of the inside of the main body 500. The motor assembly 600 may generate a rotational force by power supplied from the outside such that the blades constituting the blade assembly 200 rotate.

Accordingly, the lower end of the blade assembly 200 may be connected to the upper end of the motor assembly 600.

A knob 502 may be provided on the front surface of the main body 500 by protruding forward therefrom. The knob 502 is intended to set the operation of the blender of the present disclosure, and may be rotatably mounted to the main body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the main body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap each other in the functions of the setting and manipulating. That is, for convenience, the knob 502 and the manipulation part 504 may be configured to overlap each other in the functions such that a user may select any one of the knob 502 or the manipulation part 504 to set or manipulate the operation of the blender.

A display part 506 may be provided at a side of the manipulation part 504 (a left side of FIG. 1). That is, the display part 506 may be provided on the upper surface of the main body 500. Such a display part 506 may function to display the state of the operation of the blender such that a user can check the state thereof. Accordingly, such a display part 506 may be configured as a seven-segment display.

A cooling fan 610 may be provided at the lower side of the motor assembly 600.

The cooling fan 610 may be connected to the lower end of the motor assembly 600 and be rotated by a rotating force generated by the motor assembly 600, thereby introducing an outside air into the main body 500 and forcing the flow of the air. Accordingly, the cooling fan 610 may allow air to be introduced into the main body 500 from the outside and to flow therein, and function to cool parts such as the PCB provided in the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More specifically, the detection system may include: a power transmission means 700 provided in the main body 500 and configured to supply power to the container body 100; a power reception means 220 provided in the container body 100 and configured to receive the power supplied by the power transmission means 700; an on/off means 230 provided at the upper side of the container body 100 and configured to turn on/off the electric circuit formed in the container body 100 depending on whether the container lid 400 is closed; a transparent electrode film 240 made of a transparent material provided on a surface of the container body 100 and connecting the power reception means 220 and the on/off means 230 to each other so as to allow electricity to flow therebetween; and a detection means 800 provided on one side of the main body 500 or the container body 100 and allowing the electric circuit formed by the connection of the power reception means 220 with the on/off means 230 to form a closed circuit so as to detect whether electric current flows.

The power transmission means 700 is intended to transmit power, which is introduced to the main body 500 from the outside of the main body 500 or stored in advance in the main body 500, to the container body 100, and may use an induction coil in which induced electromotive force can be generated.

The power reception means 220 is intended to receive the power transmitted from the main body 500, and may be configured to have a structure corresponding to the structure of the power transmission means 700. That is, the power reception means 220 may use a coil such that power is transmitted by induced electromotive force generated between the power transmission means 700 and the power reception means 220.

The power transmission means 700 and the power reception means 220 may be located to be adjacent to each other so as to generate induced electromotive force. Accordingly, in the present disclosure, the power transmission means 700 is illustrated to be mounted to the right upper end of the main body 500, and the power reception means 220 is illustrated to be mounted to the right lower end of the container body.

The on/off means 230 may be configured to turn on/off the electric circuit (not shown) formed in the container body 100 depending on whether the container lid 400 is mounted to the container body 100, and may include a permanent magnet 232 and a detection sensor 234 provided in the container lid 400 and the container body 100, respectively.

As illustrated in FIG. 2, in the present disclosure, the permanent magnet 232 is illustrated to be mounted to the right edge of the container lid 400, and the detection sensor 234 is illustrated to be mounted to the right upper end (a portion of the handle) of the container body 100.

More specifically, the detection sensor 234 may be mounted to be received in a reed switch groove 236 formed in the upper end portion of the handle 300.

The detection sensor 234 may be configured as a device which can detect a magnet or magnetic field, such as a reed switch or a Hall sensor.

It is widely known that the reed switch has magnetic movable contacts enclosed in a glass tube, and when a magnet approaches the reed switch, the contacts in the glass tube contact with each other.

In addition, a Hall sensor may detect the direction and magnitude of a magnetic field by using a Hall effect that a voltage is generated in a direction perpendicular to a current and the magnetic field when the magnetic field is formed in a conductor in which the current flows, and may be a sensor using the effect of generating electric potential difference due to the voltage generated in this case.

Accordingly, the reed switch or Hall sensor is a component which is widely used, and here, further detailed description of the detailed configuration and principle thereof will be omitted.

Of course, except for the use of the permanent magnet 232 and the detection sensor 234 as such an on/off means 230, other electric on/off means or mechanical structures may be used to turn on/off the electric circuit, and the mounting positions of the permanent magnet 232 and the detection sensor 234 respectively mounted to the container lid 400 and the container body 100 may be exchanged oppositely.

Various types of electrical devices or structures having a function that can detect whether electric current flows in the electric circuit formed in the container body 100 turned on/off by the on/off means 230 may be used as the detection means 800. However, in the present disclosure, a photosensor is used to detect light as an example.

Accordingly, the detection means 800 may include a light transmission module 810 provided in the container body 100 to generate light, and a light reception module 820 provided in the main body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the main body 500.

The light transmission module 810 may use an LED that emits light by electricity, and the light reception module 820 may use the photosensor that receives light and converts the light into an electrical signal.

In addition, the transparent electrode film 240 may be provided between the outer container body 110 and the inner container body 120. More particularly, the transparent electrode film 240 may be attached to the inner surface of the outer container body 110.

The transparent electrode film 240 may be made of a member such as a conductive member which can transmit electricity. For example, the transparent electrode film 240 may be made of a transparent material such as an ITO film (an indium-tin oxide film).

The transparent electrode film 240 may be attached to the surface of the container body 100 and may allow the on/off means 230 provided on the upper side of the container body 100 to be connected to the power reception means 220 and the light transmission module 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of an electrical signal between the upper and lower ends of the container body 100.

Accordingly, when the container body 100 is made of a transparent material, and the transparent electrode film 240 is also made of a transparent material, the transparent electrode film 240 may not be visually exposed, so the appearance of the container body 100 may not be damaged and the design thereof may be maintained.

Additionally, when the transparent electrode film 240 is attached to the surface of the container body 100, the transparent electrode film 240 may have a hole formed therein to remove air bubbles that may be generated between attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the main body 500 by protruding upward therefrom.

The seating step 900 may be configured to have a circular shape corresponding to the shape of the lower end of the container body 100 such that the lower end of the container body 100 is mounted to the seating step 900 to be vertically removed therefrom.

Furthermore, the container body 100 may be configured as a double structure. That is, the container body 100 may be composed of the outer container body 110 and the inner container body 120, and the inner guides 122 may be formed on the inner surface of the inner container body 120 by protruding inward therefrom.

More specifically, the container body 100 may be configured as a double structure having a cylindrical shape as a whole. That is, the container body 100 may include the outer container body 110 constituting the appearance thereof, and the inner container body 120 provided inside the outer container body 110.

The container body 100, that is, the outer container body 110 and the inner container body 120 may be made of a transparent material. That is, the container body 100 may be made of a transparent material such as glass, Tritan, or transparent plastic such that a user can check the state of food contained inside the container body 100 from the outside.

The outer container body 110 may constitute the appearance of the container body, and be configured to have a cylindrical shape with the same top and bottom sizes, and the handle 300 may be formed on the outer right surface of the outer container body 110 by protruding therefrom to the right such that a user can grasp the handle.

The handle 300 may be formed to have an L shape, and the upper end portion thereof may be connected to the right upper end of the outer container body 110.

The reed switch groove 236 in which the detection sensor 234 is received may be formed inside the handle 300. That is, the reed switch groove 236 may be formed in the upper end of the handle 300, and may provide space to mount the detection sensor therein, and the left of such a reed switch groove 236 may be open.

Hereinafter, the configuration of the transparent electrode film 240 installed on the container body 100 will be described in detail.

Figure 3:
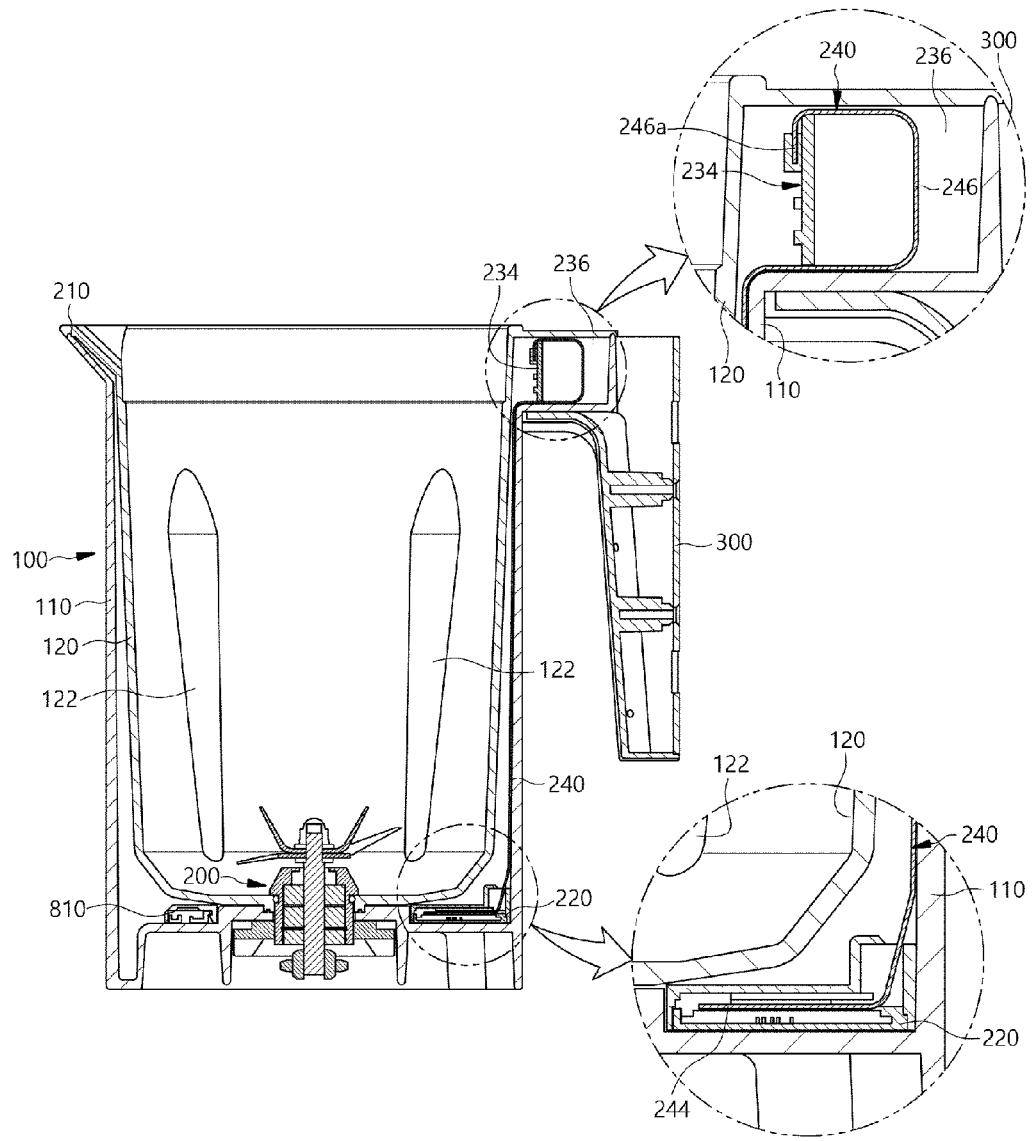
FIG. 3 is a vertical sectional view illustrating the internal configuration of a container body constituting the blender of the present disclosure according to the embodiment.
Figure 4:
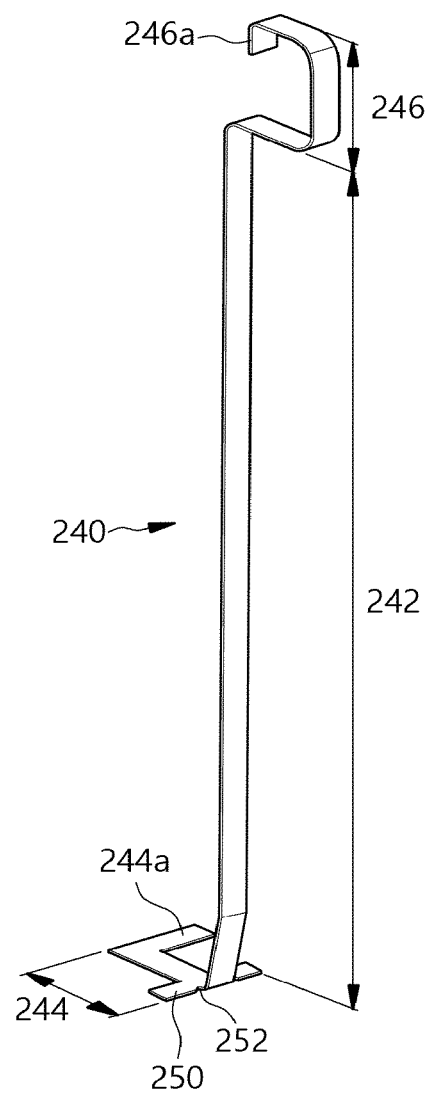
FIG. 4 is a perspective view illustrating the state of a transparent electrode film mounted to the container body constituting the blender of the present disclosure according to the embodiment.
Figure 5:
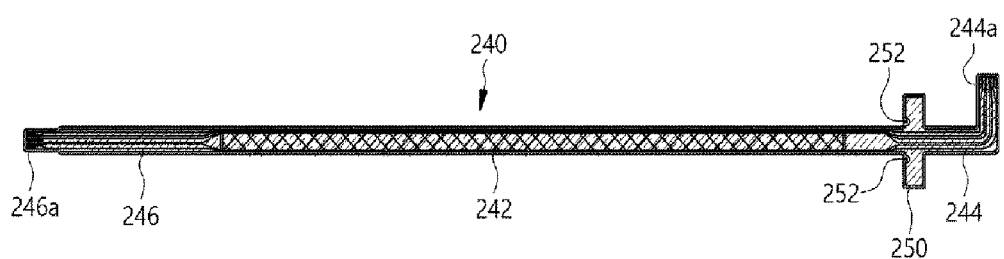
FIG. 5 is a top plan view illustrating the configuration of the transparent electrode film constituting the blender of the present disclosure according to the embodiment.
Figure 6:
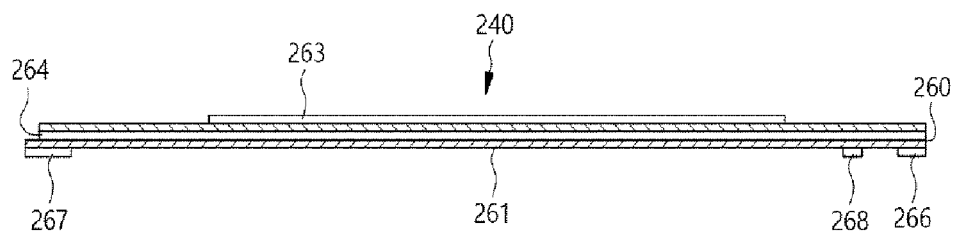
FIG. 6 is a front sectional view of the transparent electrode film illustrated in FIG. 5.
Figure 7:
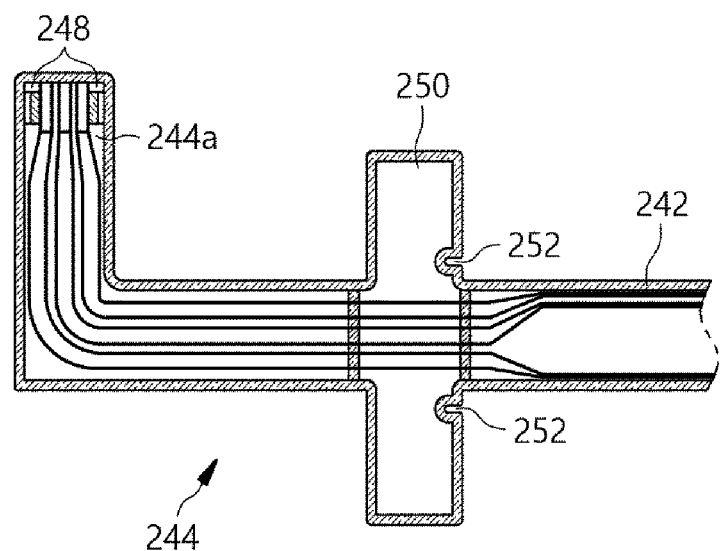
FIG. 7 is a top plan view illustrating the detailed configuration of a first bent part of the transparent electrode film constituting the blender of the present disclosure according to the embodiment.
Figure 8:
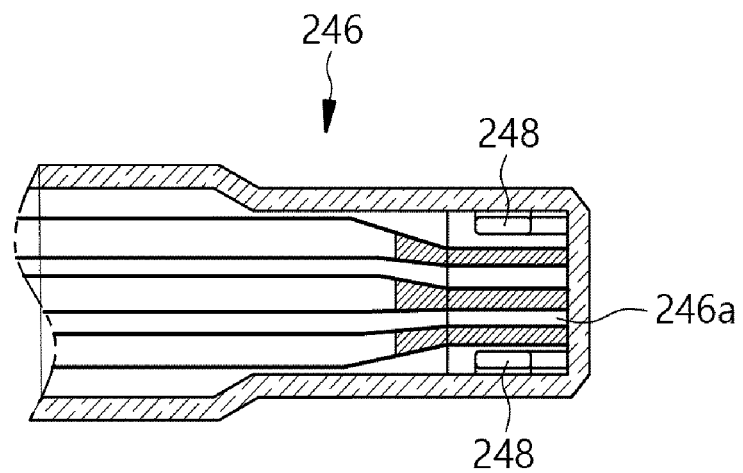
FIG. 8 is a top plan view illustrating the detailed configuration of a second bent part of the transparent electrode film constituting the blender of the present disclosure according to the embodiment.

FIG. 3 illustrates the vertical sectional view of the internal configuration of the container body 100, and FIG. 4 illustrates a perspective view showing the state of the transparent electrode film 240 mounted to the container body 100.

As illustrated in these drawings, the transparent electrode film 240 which is a component constituting the detection system which detects whether the container lid 400 is mounted on the container body 100, may function to detect whether the container lid 400 is mounted from the upper end part of the container body 100 and to transmit an associated signal to the lower end part of the container body 100.

The transparent electrode film 240 may be configured as a single member configured such that a first end thereof is connected with a second end thereof. That is, the transparent electrode film 240 may not be formed by coupling at least two members to each other, but may be formed as a long single body in the form of an integral film wire.

Accordingly, when the transparent electrode film 240 is made as a single integral film wire without an intermediate joint, cutting or damage at joints produced when the transparent electrode film consists of multiple parts may be reduced, so the durability of the transparent electrode film 240 may be basically secured.

In addition, the end of the transparent electrode film 240 may be configured to be coupled to the lower or upper end part of the container body 100 by a hook fastening method. That is, the upper end of the transparent electrode film 240 may be located on the upper end part of the container body 100, and the lower end of the transparent electrode film 240 may be located on the lower end part of the container body 100 such that a signal or electricity generated in the upper end of the container body 100 is transmitted to the lower end part of the container body 100.

More specifically, the upper end of the transparent electrode film 240 may be located on the upper end of the handle 300. That is, the upper end of the transparent electrode film 240 may be connected to the detection sensor 234 received and installed in the reed switch groove 236 formed in the upper end part of the handle 300.

The transparent electrode film 240 may include a main part 242 attached to the container body 100, a first bent part 244 formed by bending and extending from a first end of the main part 242, and a second bent part 246 formed by bending and extending from a second end of the main part 242.

More specifically, as illustrated in the drawing, the transparent electrode film 240 may be formed to be vertically long, and may include the main part 242 attached to the side surface of the container body 100, the first bent part 244 formed by bending laterally and extending from the lower end of the main part 242, and the second bent part 246 formed by extending and bending at least one time from the upper end of the main part 242 so as to be received inside the handle 300.

As illustrated in the drawing, the first bent part may be laterally so as to be perpendicular to the main part 242 as a whole, and may be bent at predetermined angles at least two times. This is because there is a risk that the transparent electrode film 240 may be cut when the transparent electrode film 240 is bent vertically in any one place.

A support part 250 may be provided on the first bent part 244 so as to supplement resistance against external force. That is, the support part 250 may be formed on the end (a right end in each of FIGS. 3 and 4) of the first bent part 244 connected with the main part 242. The support part 250 may function to supplement resistance against puling force applied to the transparent electrode film 240.

Meanwhile, a tear prevention groove 252 may be formed in the support part 250 so as to prevent damage or tearing thereof due to bending between the main part 242 and the first bent part 244. That is, as illustrated in the drawing, at least one tear prevention groove 252 may be formed in at least one end (a right end in FIG. 4) of the support part 250 in contact with the main part 242 by being recessed leftward therefrom (in FIG. 4).

In addition, the end (a left end in FIG. 4) of the first bent part 244 may be provided with a power connection end 244*a* connected with the power reception means 220, and the end (an upper end in FIG. 4) of the second bent part 246 may be provided with a sensor connection end 246*a* connected with the detection sensor 234.

Figure 9:
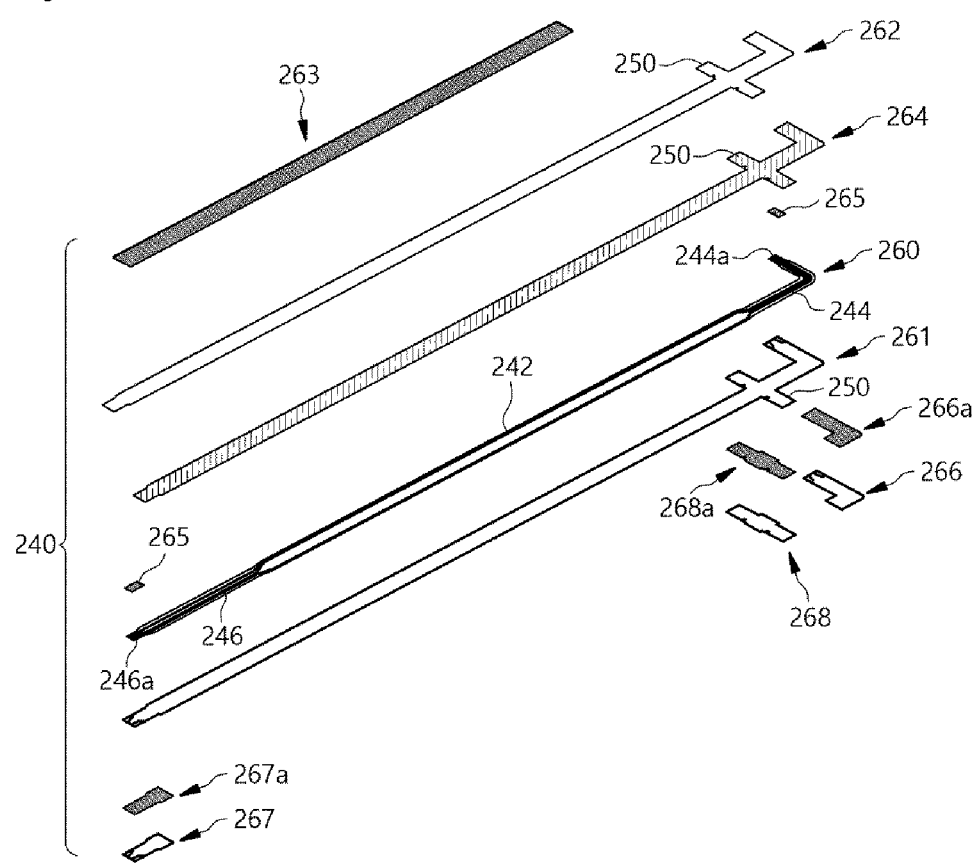
FIG. 9 is an exploded perspective view illustrating the detailed configuration of the transparent electrode film constituting the blender of the present disclosure according to the embodiment.

In FIGS. 5 to 9, the detailed configuration of the transparent electrode film 240 is illustrated. That is, FIGS. 5 and 6 respectively illustrate the top plan view and front sectional view of the transparent electrode film 240, and FIGS. 7 and 8 respectively illustrate top plan views showing the configurations of the first bent part 244 and the second bent part 246 of the transparent electrode film 240. In addition, FIG. 9 illustrates an exploded perspective view showing the detailed configuration of the transparent electrode film 240.

As illustrated in these drawings, the support part 250 may be provided on the first bent part 244 so as to supplement resistance against external force or pulling force, wherein the tear prevention groove 252 may be formed in an end of the support part 250 (a left end in FIG. 5, and a right end in FIG. 7) so as to prevent damage or tear due to bending of the support part.

A hook groove 248 into which a hook is inserted may be formed in the end of the transparent electrode film 240 by passing therethrough. That is, as illustrated in the drawings, the hook groove 248 may be formed through each of the end of the first bent part 244 (a left rear end in FIG. 7) and the end of the second bent part 246 (a right end in FIG. 8), and a hook provided in the power reception means 220 or the detection sensor 234 may be selectively inserted into the hook groove 248.

As illustrated in the drawing, the hook groove 248 may include a pair of hook grooves. In addition, the size and shape of each of the hook grooves 248 may have size and shape corresponding to a hook to be coupled thereto.

The transparent electrode film 240 may be configured to have multiple layers so as to guide the flow of electricity.

The transparent electrode film 240 may include a transmission member 260 which transmits an electrical signal, a base film 261 on which the transmission member 260 is printed, a cover film 262 which is provided at one side of the transmission member 260 and supports the transmission member 260, and a fixing member 263 which is provided at one side of the transmission member 260 and allows the transparent electrode film 240 to be attached to the container body 100.

Specifically, the transmission member 260, which constitutes the main frame of the transparent electrode film 240, may include the main part 242, the first bent part 244, and the second bent part 246 as described above, and may have the power connection end 244*a* and the sensor connection end 246*a* provided respectively on the opposite ends of the transmission member 260.

As illustrated in the drawing, the base film 261 may be formed to have a shape corresponding to the transmission member 260 as a whole. In addition, the support part 250 described above may be formed on the base film 261.

The transmission member 260 may be printed on the base film 261. That is, the transmission member 260 may be made of a silver paste material which has the thickness of 0.2 mm or less and through which electricity flows, and may be printed on the base film 261.

The cover film 262 may cover one surface of the transmission member 260 and may be made of polyethylene terephthalate (PET). As illustrated in FIG. 9, the cover film 262 may be provided on the upper side of the transmission member 260 (in FIG. 9), and may support the transmission member 260. That is, overall, the cover film 262 may serve as a support for the transparent electrode film 240.

In addition, as illustrated in the drawing, the cover film 262 may be configured to have shape and size corresponding to the shape and size of the base film 261. Accordingly, the cover film 262 may be stacked on the base film 261, and the transmission member 260 may be located between the cover film 262 and the base film 261.

The fixing member 263 may be provided at a side of the transmission member 260 (an upper side in FIG. 9), and may function to attach the transparent electrode film 240 to the container body 100.

As illustrated in the drawing, the fixing member 263 may be formed in the shape of a tape having a predetermined length as a whole, and may be formed to have length and width corresponding to the length and width of the main part 242 of the transmission member 260. That is, the fixing member 263 may function to attach and fix the transparent electrode film 240 to the container body 100, and thus may have a size corresponding to the size of the main part 242 of the transparent electrode film 240.

One surface of the fixing member 263 may be installed to be in contact with one surface of the cover film 262. That is, as illustrated in the drawing, the fixing member 263 may be made as an adhesive member such as a double-sided tape, and the lower surface of the fixing member 263 (in FIG. 9) may be installed to be in contact with the upper surface of the cover film 262 (in FIG. 9).

An adhesive member 264 may be provided between the transmission member 260 and the cover film 262 such that the transmission member 260 and the cover film 262 are coupled to each other.

The adhesive member 264 may be made of a material including an adhesive such as a double-sided tape, and may allow the transmission member 260 and the cover film 262 to be attached to each other.

Meanwhile, as illustrated in the drawing, the adhesive member 264 may be formed to have shape and size corresponding to the shape and size of each of the base film 261 and the cover film 262. Accordingly, the support part 250 of the base film 261 and the support part 250 of the cover film 262 may be attached to each other by the support part 250 of the adhesive member 264.

In addition, a coating layer 265 may be formed on the end of the transmission member 260 so as to prevent corrosion thereof. That is, the end of the transmission member 260 which is the contact part of the transmission member 260 made of a silver paste material may be coated with carbon so as to prevent corrosion of the contact part.

Such carbon coating may be selectively performed on the upper or lower surface of the end of the transmission member 260 or may be performed on all of the upper and lower surfaces thereof. That is, the coating layer 265 may be formed on one surface of the end of the transmission member 260, and may be formed to cover the entirety of the end thereof.

A reinforcement piece 266, 267, or 268 may be provided on an end of the transparent electrode film 240 so as to reinforce rigidity thereof. The reinforcement piece 266, 267, or 268 may be a stiffener for reinforcing the rigidity of the transparent electrode film 240, and may be provided at least on each of the ends of the first bent part 244 and the second bent part 246 of the transparent electrode film 240. That is, a bending reinforcement piece 266 may be provided on the end of the first bent part 244 of the transparent electrode film 240, and a connector reinforcement piece 267 may be provided on the end of the second bent part 246.

Of course, as illustrated in FIG. 9, the reinforcement piece 266, 267, or 268 may be further provided even on one side of the support part 250 so as to supplement rigidity thereof. That is, a support reinforcement piece 268 may be provided on the lower side (in FIG. 9) of the support part 250 so as to reinforce the rigidity of the support part 250.

In addition, the reinforcement piece 266, 267, or 268 may be attached and fixed to the base film 261 by an adhesive. Specifically, the bending reinforcement piece 266 may be attached to the first bent part 244 by a bending adhesive member 266a, the connector reinforcement piece 267 may be attached to the second bent part 246 by a connector adhesive member 267a, and the support reinforcement piece 268 may be attached to the support part 250 of the base film 261 by a support adhesive member 268a.

Each of the bending adhesive member 266a, the connector adhesive member 267a, and the support adhesive member 268a may also be made as a member having an adhesive on both sides, such as a double-sided tape.

Figure 10:
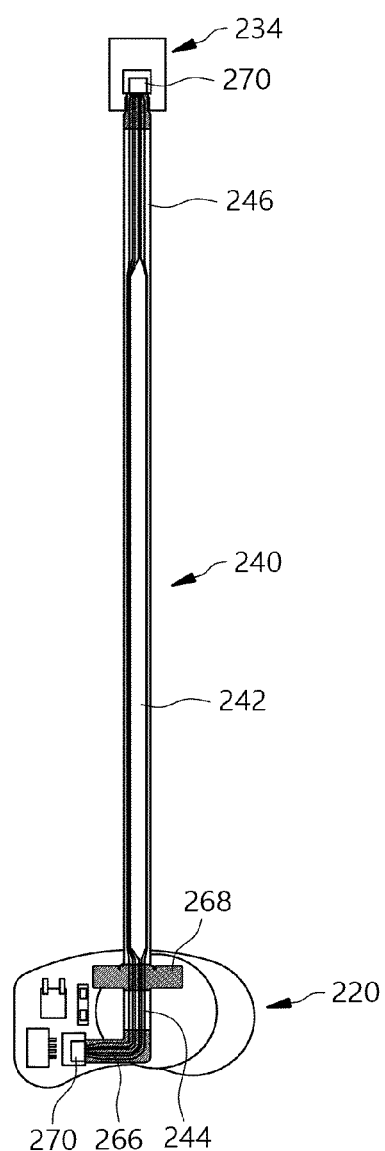
FIG. 10 is a top plan view illustrating a state in which the transparent electrode film, a power reception means, and a detection sensor constituting the blender of the present disclosure are coupled to each other according to the embodiment.
Figure 11:
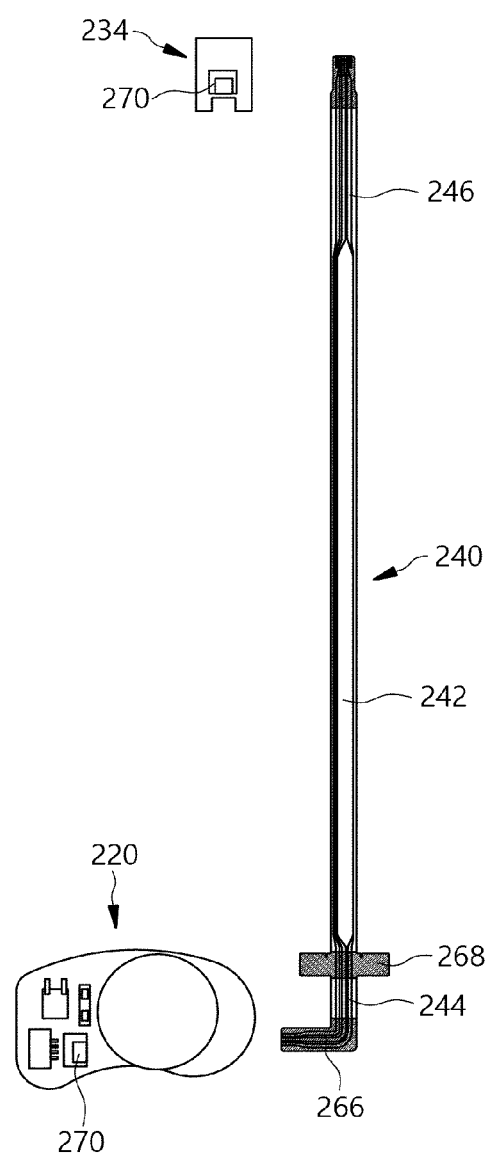
FIG. 11 is a top plan view illustrating a state in which the transparent electrode film, the power reception means, and the detection sensor constituting the blender of the present disclosure are removed from each other according to the embodiment.

FIG. 10 illustrates a top plan view showing a state in which the transparent electrode film 240 is coupled to the power reception means 220 and the detection sensor 234, and FIG. 11 illustrates a top plan view showing a state in which the transparent electrode film 240 is removed from the power reception means 220 and the detection sensor 234.

As illustrated in these drawings, the power reception means 220 and the detection sensor 234 may respectively include hook connectors 270, and the opposite ends of the transparent electrode film 240 may be respectively coupled to the hook connectors 270.

Specifically, as illustrated in the drawing, the end of the first bent part 244 of the transparent electrode film 240 may be connected to the hook connector 270 of the power reception means 220, and the end of the second bent part 246 of the transparent electrode film 240 may be connected to the hook connector 270 of the detection sensor 234.

Figure 12:
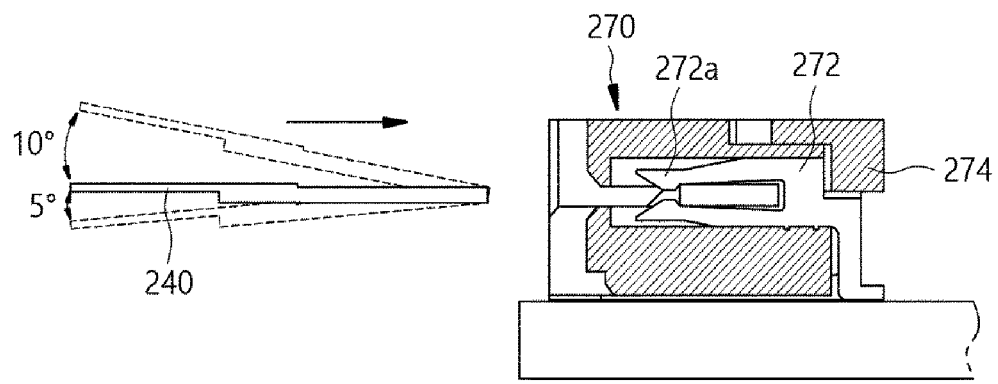
FIG. 12 is a partially sectional view illustrating a state in which the transparent electrode film is inserted into a hook connector constituting the blender of the present disclosure according to the embodiment.
Figure 13:
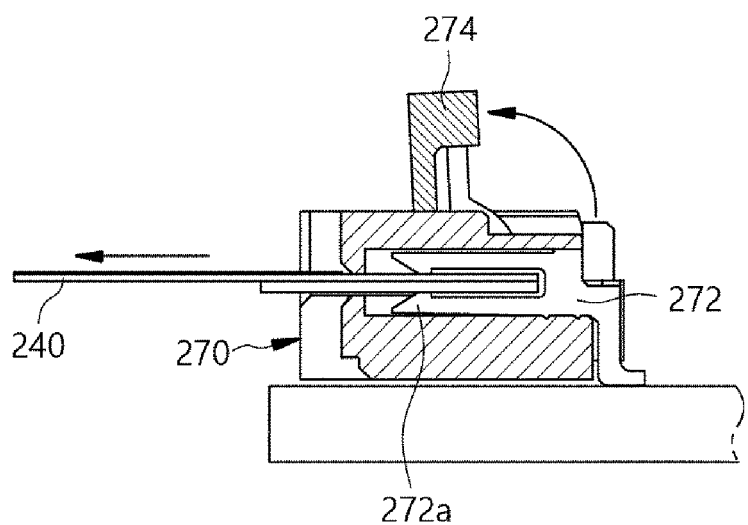
FIG. 13 is a partially sectional view illustrating a state in which the transparent electrode film is removed from the hook connector constituting the blender of the present disclosure according to the embodiment.

FIGS. 12 and 13 respectively illustrate partial sectional views showing states in which the end of the transparent electrode film 240 is inserted into and removed from the hook connector 270. That is, in FIGS. 12 and 13, an example of the hook connector 270 is illustrated.

As illustrated in these drawings, the hook connector 270 may be provided with a hook to which the end of the transparent electrode film 240 is fitted and coupled. That is, the hook connector 270 may include a fixing hook 272.

In addition, as illustrated in the drawings, such a fixing hook 272 may be provided with a pair of hook protrusions 272a which is provided vertically and can be in close contact with each other due to elasticity thereof.

The pair of hook protrusions 272a may be configured to have a shape vertically symmetrical to each other such that the hook protrusions are respectively inserted into the hook grooves 248 formed in the end of the transparent electrode film 240.

In addition, the hook connector 270 may further include a hook cover 274 which forces the hook protrusions 272a of the fixing hook 272 to move.

The fixing hook 272 may be configured to be selectively pressed by rotating and opening/closing the hook cover 274 such that the hook protrusions 272a are inserted into or removed from the hook grooves 248 formed in the end of the transparent electrode film 240.

Specifically, as illustrated in FIG. 12, when the hook cover 274 is closed, the hook protrusions 272a located at upper and lower sides may be close to each other by elastic force, and when the end of the transparent electrode film 240 is inserted into space between the pair of hook protrusions 272*a*, the hook protrusions 272*a* may be inserted into the hook grooves 248 of the transparent electrode film 240, and accordingly, the end of the transparent electrode film 240 may be coupled and fixed to the hook connector 270.

Next, as illustrated in FIG. 13, when the hook cover 274 is counterclockwise (in FIG. 13), the pair of hook protrusions 272*a* may respectively move upward and downward and thus a distance between the hook protrusions 272*a* may increase.

In this case, the hook protrusions 272*a* inserted into the hook grooves 248 of the transparent electrode film 240 may be removed from the hook grooves 248, respectively, and thus the end of the transparent electrode film 240 may be removed from the hook connector 270.

The scope of the present disclosure is not limited to the embodiment illustrated above, and within the technical scope as described above, many other modifications based on the present disclosure may be made by those skilled in the art.

The invention claimed is:

1. A blender comprising:
a container body in which food is accommodated;
a main body to support the container body;
a container lid detachably mounted on an upper surface of the container body so as to open and close the upper surface of the container body; and
a detection system which detects whether the container lid is mounted on the container body, wherein the detection system comprises a transparent electrode film to guide a flow of electricity, the transparent electrode film having multiple layers, the transparent electrode film comprising a transmission member which transmits the flow of electricity, and a base film on which the transmission member is provided.

2. The blender of claim 1, wherein the transparent electrode film comprises a cover film provided at one side of the transmission member, which covers the transmission member.

3. The blender of claim 2, comprising a fixing member which allows the transparent electrode film to be fixed to the container body.

4. The blender of claim 3, wherein one surface of the fixing member is in contact with one surface of the cover film.

5. The blender of claim 2, wherein the transparent electrode film comprises an adhesive member provided between the transmission member and the cover film such that the transmission member and the cover film are coupled to each other.

6. The blender of claim 1, wherein the transparent electrode film comprises a coating layer formed on an end of the transmission member so as to prevent corrosion of the end of the transmission member.

7. The blender of claim 1, wherein the transparent electrode film is a single integral member configured such that a first end of the transparent electrode film is connected with a second end of the transparent electrode film with no break in between.

8. The blender of claim 1, wherein the transparent electrode film comprises a main part attached to the container body, a first bent part formed by bending and extending from a first end of the main part, and a second bent part formed by bending and extending from a second end of the main part.

9. The blender of claim 8, comprising a support part provided at the first bent part so as to supplement resistance against external force.

10. The blender of claim 9, wherein the support part protrudes from the first bent part.

11. The blender of claim 10, wherein the support part includes a tear prevention groove to prevent damage or tearing of the support part due to bending between the main part and the first bent part.

12. The blender of claim 9, comprising a reinforcement piece provided on one side of the support part so as to supplement rigidity of the support part.

13. The blender of claim 1, comprising a reinforcement piece provided at the transparent electrode film so as to supplement rigidity of the transparent electrode film.

14. The blender of claim 1, wherein an end of the transparent electrode film is coupled to an end part of the container body by a hook fastener.

15. The blender of claim 14, wherein the end of the transparent electrode film comprises a hook groove in which a hook of the hook fastener is inserted.

16. The blender of claim 1, wherein the transmission member is printed on the base film.

17. The blender of claim 16, wherein the transmission member is formed from a silver paste material.

* * * * *